United States Patent

[11] 3,593,667

| [72] | Inventor | Raymond L. Morris<br>1028 15th Ave., Honolulu, Hawaii 96816 |
| [21] | Appl. No. | 839,412 |
| [22] | Filed | July 7, 1969 |
| [45] | Patented | July 20, 1971 |

[54] GUIDANCE SYSTEM FOR DUAL-MODE VEHICLE
7 Claims, 6 Drawing Figs.

| [52] | U.S. Cl. | 104/120 |
| [51] | Int. Cl. | B62d 11/00, B61b 13/00 |
| [50] | Field of Search | 104/120, 23 FS, 118 |

[56] References Cited

UNITED STATES PATENTS

| 1,602,066 | 10/1926 | Burton | 104/120 |
| 2,853,956 | 9/1958 | Wennergren et al. | 104/23 FS |
| 3,426,703 | 2/1969 | Morris | 104/120 |

FOREIGN PATENTS

| 378,928 | 6/1964 | Switzerland | 104/120 |

Primary Examiner—Arthur L. La Point
Assistant Examiner—D. W. Keen
Attorney—Harris, Kiech, Russell and Kern ABSTRACT: A vehicle capable of operation on a track having a central guide rail, or on city streets, on highways, or the like. When operating on the track, guide wheels engageable with opposite sides of the central guide rail serve to guide the vehicle. For operation off the track, the guide wheels are retracted and the vehicle is steered by the operator thereof. Retractable locking bars permit pivoting of the guide wheels between their extended and retracted positions, and are extended to positively lock the guide wheels in their extended positions or their retracted positions. An irreversible worm drive insures against creeping of the locking bars out of their extended, locking positions.

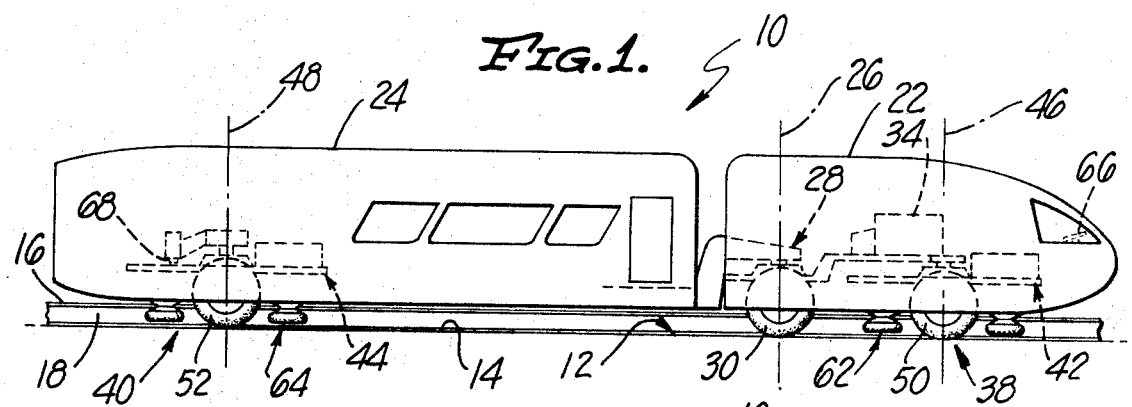
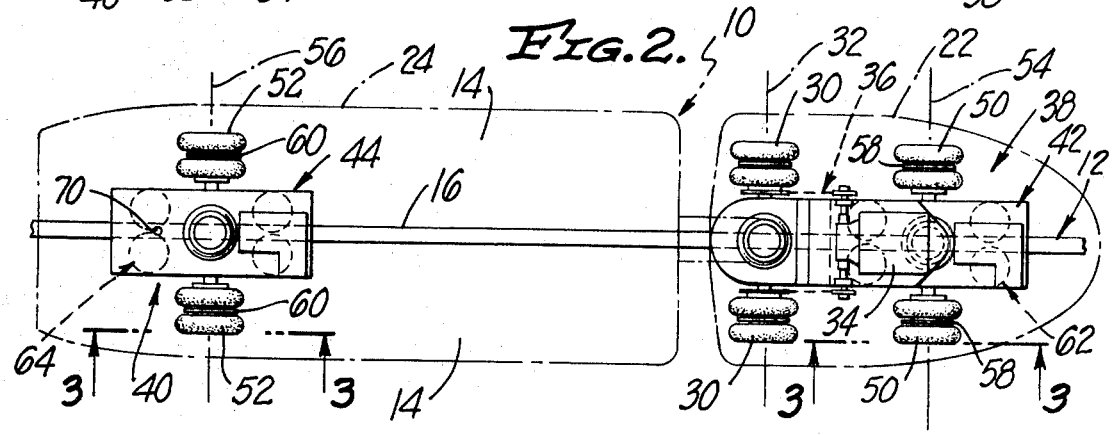
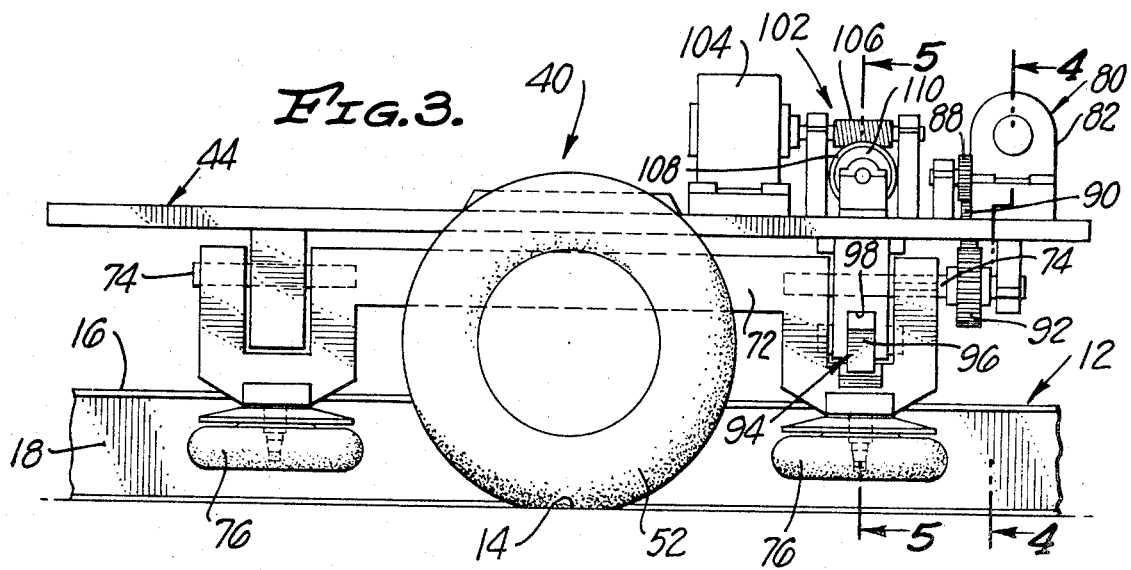

INVENTOR
RAYMOND. L. MORRIS
BY HIS ATTORNEYS
HARRIS, KIECH, RUSSELL & KERN

GUIDANCE SYSTEM FOR DUAL-MODE VEHICLE

BACKGROUND OF INVENTION

The present invention relates in general to a dual-mode vehicle, i.e., a vehicle capable of operating either on a track having a central guide rail, or on ordinary city streets, highways, or the like. More particularly, the invention relates to a retractable guidance system for such a vehicle, the guidance system engaging the central guide rail when the vehicle is operating on the track, and being retracted when the vehicle is operating off the track.

In general, the invention contemplates a track having laterally spaced, horizontal, longitudinal track surfaces which are separated by the central guide rail, the latter being provided on opposite sides thereof with laterally spaced, vertical, longitudinal guide surfaces.

As further background, the invention contemplates a vehicle having a frame supported at least in part by a truck having a truck frame connected to the vehicle frame for pivotal movement relative thereto about a vertical, truck-frame axis. Two laterally spaced vertical supporting wheels, respectively engageable with the track surfaces, are rotatable about a laterally-extending, supporting-wheel axis intersecting and perpendicular to the truck-frame axis. With this construction, when the vehicle is negotiating a curve in the track, the supporting-wheel axis coincides precisely with a line radiating from the center of the curve at all times. Consequently, the supporting wheels are always exactly tangent to the curved paths they must follow so that they negotiate such paths without skidding. The invention still further contemplates mounting on each truck frame two guide-wheel frames which are pivotable upwardly and downwardly between retracted and extended positions, each guide-wheel frame having rotatably mounted thereon two guide wheels engageable with one of the guide surfaces on the central guide rail and respectively located equal distances forwardly and rearwardly of the truck-frame and supporting-wheel axes.

As further background, the present invention relates to a vehicle and guidance system embodying many of the features disclosed and claimed in my U.S. Pat. No. 3,426,703, granted Feb. 11, 1969.

SUMMARY AND OBJECTS OF INVENTION

In general, a primary object of the invention is to provide a guidance system wherein the pairs of guide wheels which are engageable with the respective guide surfaces of the central rail are mounted on guide-wheel frames pivotable relative to the truck frame downwardly and inwardly toward each other into extended positions, and upwardly and outwardly away from each other into retracted positions, about laterally spaced, longitudinal guide-wheel-frame axes on opposite sides of and equidistant from the truck-frame axis.

Another and important object of the invention is to provide a vehicle of the type under consideration wherein the guide-wheel frames are positively locked in their extended and retracted positions by locking means comprising: two locking bars respectively associated with the guide-wheel frames and mounted on the truck frame for sliding movement between extended and retracted positions; and stops on the guide-wheel frames respectively engageable with stops on opposite sides of the locking bars when the guide wheel frames are in their extended and retracted positions, respectively, and when the locking bars are in their extended positions. The locking bars are sturdy rectangular bars the edges of which act positively to retain the guide-wheel frames in their extended and retracted positions, which is an important feature.

Another object is to provide means for extending and retracting the locking bars which comprises an irreversible worm means.

Still another object is to provide locking bars which are mounted on the truck frame for sliding movement downwardly and outwardly into their extended positions and upwardly and inwardly into their retracted positions, along paths making angles of substantially 45° with the vertical.

Still another object of the invention is to provide a vehicle of the foregoing general character which includes a tractor and trailer combination and wherein two of the hereinbefore described pivoted trucks respectively support the front end of the tractor and rear end of the trailer, the one supporting the front end of the tractor being steerable for operation of the vehicle off the track. A related object is to provide such a vehicle the frame of which includes a tractor frame and a trailer frame connected to the rear end of the tractor frame for pivotal movement about a vertical, trailer-frame axis.

Another object in the foregoing connection is to provide the rear end of the tractor frame with traction wheels rotatable about an axis perpendicular to and intersected by the trailer-frame axis, together with means for driving the traction wheels.

The foregoing objects, advantages, features and results of the present invention, together with various other objects, advantages, features and results thereof which will be evident to those skilled in the transportation art in the light of this disclosure, may be achieved with the exemplary embodiment of the invention described in detail hereinafter and illustrated in the accompanying drawings.

DESCRIPTION OF DRAWINGS

In the drawings:

FIG. 1 is a side elevational view of a tractor-trailer vehicle which embodies the invention;

FIG. 2 is a plan view showing the supporting, driving and guiding wheel systems of the vehicle;

FIG. 3 is an enlarged, fragmentary, side elevational view taken as indicated by either of the arrowed lines 3–3 of FIG. 2;

DESCRIPTION OF THE EXEMPLARY EMBODIMENT OF INVENTION

Figure 6:
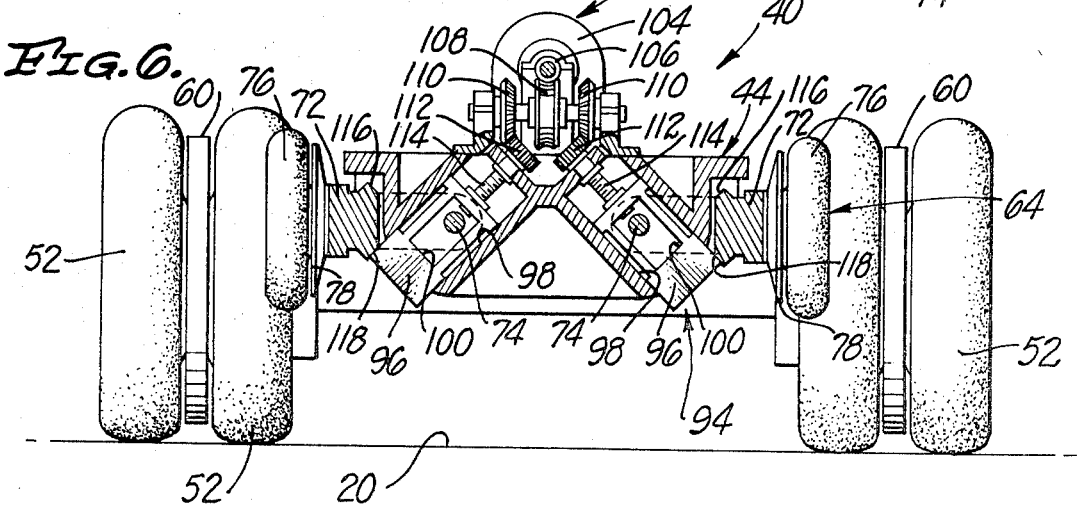
FIG. 6 is a view similar to FIG. 5, but showing a guidance system of the invention locked in upwardly retracted positions.

Referring to the drawings, illustrated therein is a vehicle 10 capable of operating either on a track 12 having laterally spaced, horizontal, longitudinal track surfaces 14 separated by a central guide rail 16 provided on opposite sides thereof with laterally spaced, vertical, longitudinal guide surfaces 18, or on a plain, untracked surface 20, FIG. 6, such as a city street, highway, or the like.

In the construction illustrated, the vehicle 10 is an articulated vehicle comprising a tractor 22 and a semitrailer 24. The articulated tractor and trailer frames forming the overall vehicle frame are interconnected for relative pivotal movement about a vertical, trailer-frame axis 26 by any suitable means 28.

The vehicle 10 is propelled by traction wheels 30 mounted on the tractor frame for rotation about a laterally extending, traction-wheel axis 32 perpendicular to and intersecting the trailer-frame axis 26. The traction wheels 30 may be driven by an engine or motor 34 through any suitable drive train, designated generally by the numeral 36.

The front end of the tractor 22 and the rear end of the trailer 24 are supported by trucks 38 and 40 respectively having frames connected to the frames of the tractor and the trailer for pivotal movement about vertical, truck-frame axes 46 and 48, as disclosed in more detail in my aforementioned patent. As also disclosed in that patent, rotatably mounted on the truck frames 42 and 44 are supporting wheels 50 and 52 engageable with the track surfaces 14 and respectively rotatable about supporting-wheel axes 54 and 56 perpendicular to and intersecting the truck-frame axes 46 and 48. As hereinbefore discussed, and as explained in the patent mentioned, this permits the supporting wheels 50 and 52 to negotiate curves in the track 12 without skidding. In the construction illustrated, the supporting wheels 50 comprise two sets of dual wheels respectively located on opposite sides of the truck-frame axis 46, the dual wheels of each set being separated by a tire deflation disc 58. Similarly, the supporting wheels 52 comprise two sets of dual wheels located on opposite sides of the axis 48, the wheels of each set being separated by a tire deflation disc 60.

When the vehicle 10 is running on the track 12, guidance systems 62 and 64 carried by the truck frames 42 and 44 cause the trucks 38 and 40 to follow the central guide rail 16, and to maintain the supporting-wheel axes 54 and 56 oriented along radial lines through the centers of any curves negotiated by the vehicle, thereby preventing skidding of the supporting wheels. When negotiating curves, the traction wheels 30 may cut the corners slightly, but the track surfaces 14 are wide enough to permit this for the sharpest curves encountered, without interference by the central guide rail 16.

As will be explained hereinafter, the guidance systems 62 and 64 are retractable upwardly when the vehicle 10 is operated off the track 12. Under such conditions, the vehicle 10 may be steered by pivoting the truck 38. The tractor 22 is shown as being provided with a steering wheel 66 which is adapted to pivot the truck frame 42 about the vertical axis 46 in any appropriate manner, as through a suitable mechanical, hydraulic, electrical, or other connection, not shown. If desired, the steering wheel 66 may be connected to the truck 38 through a hydraulic power steering system, not shown. When the vehicle 10 is operating off the track 12, the truck 40 is preferably locked against pivoting about the axis 48. This may be accomplished by a hydraulically actuated plunger 68, FIG. 1, carried by the frame of the trailer 24 and insertable into a hole 70, FIG. 2, in the truck frame 44.

The guidance systems 62 and 64 for the respective trucks 38 and 40 are identical. For convenience, only the guidance system 64 will be considered in detail in connection with FIGS. 3 to 6 of the drawings.

Figure 4:
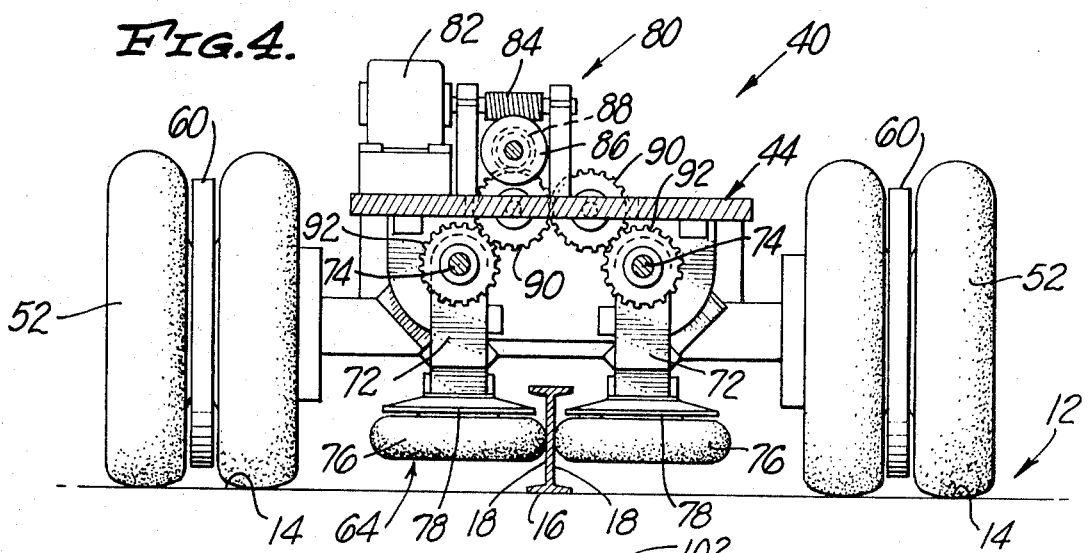
FIGS. 4 and 5 are sectional views taken as indicated by the arrowed lines 4–4 and 5–5, respectively, of FIG. 3.

The guidance system 64 includes two guide-wheel frames 72 which are elongated in the fore-and-aft or longitudinal direction. Longitudinal pivots 74 mount the guide-wheel frames 72 on the truck frame 44 for pivotal movement downwardly and inwardly toward each other into extended positions, as shown in FIGS. 4 and 5, and upwardly and outwardly away from each other into retracted positions, as shown in FIG. 6, about laterally spaced, longitudinal guide-wheel-frame axes disposed on opposite sides of and equidistant from the corresponding truck-frame axis 48.

The guide-wheel frames 72 carry guide wheels 76 which are rotatable about vertical axes and engageable with the guide surfaces 18 when the guide-wheel frames 72 are in their extended positions. The guidance system 64 includes four of the guide wheels 76, two on each guide-wheel frame 72. Two of the guide wheels 76 are located forwardly of the axis 48 and the other two are located an equal distance rearwardly thereof. With this construction, maintenance of the supporting-wheel axis 56 on a radial line at all times when negotiating a curve is assured. The respective guide wheels 76 are equipped with tire deflation discs 78 which come into play in the event of deflation of the tires of the associated guide wheels.

An actuating means 80 pivots the guide-wheel frames 72 back and forth between their extended and retracted positions. The actuating means 80 is shown as comprising a motor 82 mounted on the truck frame 44 and driving a worm 84 meshed with a worm wheel 86. The latter drives a gear 88 meshed with one of a pair of intermeshed gears 90 which, in turn, are meshed with gears 92 fixed on two of the pivots 74 for the respective guide-wheel frames 72, such pivots being suitably keyed to the respective guide-wheel frames. With this construction, the motor 82 pivots the guide-wheel frames back and forth between their extended and retracted positions. The worm drive incorporated in the train between the motor 82 and the guide-wheel frames 72 is, of course, irreversible and thus tends to maintain the guide-wheel frames in their extended positions or retracted positions.

Figure 5:
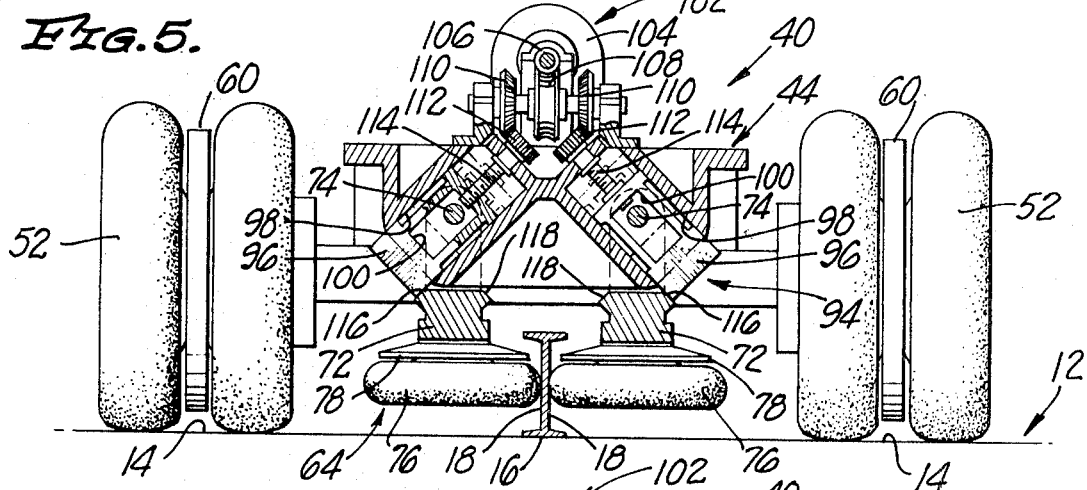

However, the guide-wheel frames 72 are positively locked in their extended positions, or their retracted positions, by a locking means 94 which is best shown in FIGS. 5 and 6 of the drawings. The locking means 94 comprises two generally rectangular locking bars 96 respectively associated with the guide-wheel frames 72 and mounted on the truck frame 44 for sliding movement downwardly and outwardly into extended positions, FIGS. 5 and 6, and upwardly and inwardly into retracted positions, not shown. The locking bars 96 are slidable in complementary guides 98 of rectangular cross section carried by the truck frame 44. It will be noted that the adjacent pivots 74 for the two guide-wheel frames 72 pass through elongated openings 100 in the locking bars 96 to prevent the locking bars from dropping out of their guides 98 even in the event of failure of the hereinafter described means 102 for extending and retracting the locking bars.

The means 102 is shown as comprising a motor 104 mounted on the truck frame 44 and driving a worm 106 meshed with a worm wheel 108. The latter drives bevel gears 110 meshed with gears 112 driving screws 114 threadedly engaged with the locking bars 96. As will be apparent, rotation of the screws 114 in opposite directions results in extension and retraction of the locking bars 96.

The guide-wheel frames 72 are provided thereon with bevelled stops 116 engageable by the lower longitudinal edges of the locking bars 96, which are preferably oriented at angles of substantially 45° to the vertical, to maintain the guide-wheel frames in their extended positions. Similarly, the guide-wheel frames 72 are provided with bevelled stops 118 engageable by the upper longitudinal edges of the locking bars 96 to positively secure the guide-wheel frames 72 in their retracted positions. The guide-wheel frames 72 and the locking means 94 are of sturdy construction to insure retention of the guide-wheel frames 72 in either their extended positions or their retracted positions, this despite substantial loads on the guide wheels 76 in negotiating curves.

When the guide-wheel frames 72 are retracted, the guide wheels 76 are elevated far enough to provide adequate ground clearance for operation off the track 12.

Although an exemplary embodiment of the invention has been disclosed for purposes of illustration, it will be understood that the invention may be incorporated in other embodiments and that various changes, modifications and substitutions may be incorporated in the particular embodiment disclosed.

I claim as my invention:

1. A truck for supporting a vehicle for movement along a track having laterally spaced, horizontal, longitudinal track surfaces separated by a central guide rail provided on opposite sides thereof with laterally spaced, vertical, longitudinal guide surfaces, the combination of:

a. a truck frame;
   b. two laterally spaced, vertical supporting wheels respectively engageable with said track surfaces and rotatable relative to said truck frame about a laterally extending, supporting-wheel axis;
   c. two guide-wheel frames mounted on said truck frame for pivotal movement downwardly and inwardly toward each other into extended positions, and upwardly and outwardly away from each other into retracted positions, about laterally spaced, longitudinal guide-wheel frame axes;
   d. guide wheels respectively rotatably mounted on said guide-wheel frames and respectively engageable with said guide surfaces when said guide-wheel frames are in their extended positions;
   e. actuating means for pivoting said guide-wheel frames between their extended and retracted positions; and
   f. locking means engageable with the extended and the retracted guide-wheel frames for locking said guide-wheel frames in their extended positions and in their retracted positions.

2. In a vehicle for use on a track having laterally spaced, horizontal, longitudinal track surfaces separated by a central guide rail provided on opposite sides thereof with laterally spaced, vertical, longitudinal guide surfaces, the combination of:
  a. a vehicle frame;
  b. at least one truck for supporting at least a part of said vehicle frame and including a truck frame connected to said vehicle frame for pivotal movement relative thereto about a vertical, truck-frame axis;
  c. two laterally spaced, vertical supporting wheels respectively engageable with said track surfaces and rotatable relative to said truck frame about a laterally extending, supporting-wheel axis intersecting and perpendicular to said truck-frame axis;
  d. two guide-wheel frames mounted on said truck frame for pivotal movement downwardly and inwardly toward each other into extended positions, and upwardly and outwardly away from each other into retracted positions, about laterally spaced, longitudinal guide-wheel-frame axes on opposite sides of and equidistant from said truck-frame axis;
  e. guide wheels respectively rotatably mounted on said guide-wheel frames and respectively engageable with said guide surfaces when said guide-wheel frames are in their extended positions;
  f. actuating means for pivoting said guide-wheel frames between their extended and retracted positions; and
  g. locking means engageable with the extended and the retracted guide-wheel frames for locking said guide-wheel frames in their extended positions and in their retracted positions.

3. A vehicle as defined in claim 2 wherein said locking means includes:
  a. two locking bars respectively associated with said guide-wheel frames and mounted on said truck frame for sliding movement between extended and retracted positions;
  b. stops on each of said guide-wheel frames respectively engageable with opposite sides of the corresponding one of said locking bars when that guide-wheel frame is in its extended and retracted positions, respectively, and when said one locking bar is in its extended position; and
  c. means for extending and retracting said locking bars.

4. A vehicle according to claim 3 wherein said locking bars are mounted on said truck frame for sliding movement downwardly and outwardly into their extended positions and upwardly and inwardly into their retracted positions.

5. A vehicle as set forth in claim 4 wherein there are two of said guide wheels on each of said guide-wheel frames respectively located equal distances forwardly and rearwardly of said truck-frame and supporting-wheel axes.

6. A vehicle according to claim 5 wherein said means for extending and retracting said locking bars includes worm means.

7. In a vehicle for use on a track having laterally spaced, horizontal, longitudinal track surfaces separated by a central guide rail provided on opposite sides thereof with laterally spaced, vertical, longitudinal guide surfaces, the combination of:
  a. a vehicle frame including a tractor frame and including a trailer frame connected to said tractor frame adjacent the rear end thereof for pivotal movement relative thereto about a vertical, trailer-frame axis;
  b. two longitudinally spaced trucks respectively including truck frames one pivotally connected to said tractor frame adjacent the front end thereof and the other pivotally connected to said trailer frame adjacent the rear end thereof, for pivotal movement relative thereto about vertical, truck-frame axes;
  c. each of said trucks including two laterally spaced, vertical supporting wheels respectively engageable with said track surfaces and rotatable relative to the corresponding truck frame about a laterally extending, supporting-wheel axis intersecting and perpendicular to the corresponding truck-frame axis;
  d. each of said truck also including two guide-wheel frames mounted on the corresponding truck frame for upward pivotal movement into retracted positions and downward pivotal movement into extended positions;
  e. guide wheels respectively rotatably mounted on said guide-wheel frames of each of said trucks and respectively engageable with said guide surfaces when said guide-wheel frames are in their extended positions;
  f. actuating means for pivoting said guide-wheel frames between their extended and retracted positions;
  g. steering means for pivoting said one truck frame about its truck-frame axis;
  h. traction wheels mounted on said tractor frame adjacent said rear end thereof for rotation about a laterally extending, traction-wheel axis and respectively engageable with said track surfaces; and
  i. means for driving said traction wheels.